United States Patent [19]
Miyake

[11] Patent Number: 5,373,398
[45] Date of Patent: Dec. 13, 1994

[54] VIDEO TAPE RECORDER WITH AUDIO CARRIER ABSENCE DETECTION

[75] Inventor: Yoshitaka Miyake, Kanagawa, Japan

[73] Assignee: Sony Corporation, Tokyo, Japan

[21] Appl. No.: 228,188

[22] Filed: Apr. 15, 1994

Related U.S. Application Data

[63] Continuation of Ser. No. 64,347, May 20, 1993, abandoned, which is a continuation of Ser. No. 629,701, Dec. 18, 1990, abandoned.

[30] Foreign Application Priority Data

Dec. 19, 1989 [JP] Japan .................................. 1-328914

[51] Int. Cl.$^5$ ............................................. G11B 20/06
[52] U.S. Cl. .......................................... 360/30; 360/29
[58] Field of Search ................. 360/30; 369/86, 91; 358/196, 198, 144, 198; 381/13; 455/222, 227

[56] References Cited

U.S. PATENT DOCUMENTS

| | | | |
|---|---|---|---|
| 3,795,764 | 3/1974 | Altmann | 178/5.8 |
| 3,979,679 | 9/1976 | Bush et al. | 455/222 |
| 4,148,060 | 4/1979 | Hershberg | 358/83 |
| 4,564,868 | 1/1986 | Arafune | 360/19.1 |
| 4,633,495 | 12/1986 | Schotz | 381/3 |
| 4,683,502 | 7/1987 | Higashi et al. | 358/342 |
| 4,817,151 | 3/1989 | Bod et al. | 381/13 |

FOREIGN PATENT DOCUMENTS 0066252 8/1982 European Pat. Off. .
2096435 10/1982 United Kingdom .

OTHER PUBLICATIONS

Patent Abstracts of Japan vol. 12, No. 474, Dec. 12, 1988.

*Primary Examiner*—Aristotelis Psitos
*Assistant Examiner*—Jennifer Pearson
*Attorney, Agent, or Firm*—Hill, Steadman & Simpson

[57] ABSTRACT

A video tape recorder for recording and/or reproducing a stereo frequency-modulated audio signal by a pair of carrier signals of an indispensable first carrier signal and an additional second carrier signal is comprised of a circuit for demodulating the second carrier signal to provide a demodulated output, and a comparator for comparing an amplitude of the demodulated output with a predetermined value. When the amplitude of the demodulated output is below the predetermined value, it is determined that the second carrier signal exists.

3 Claims, 3 Drawing Sheets

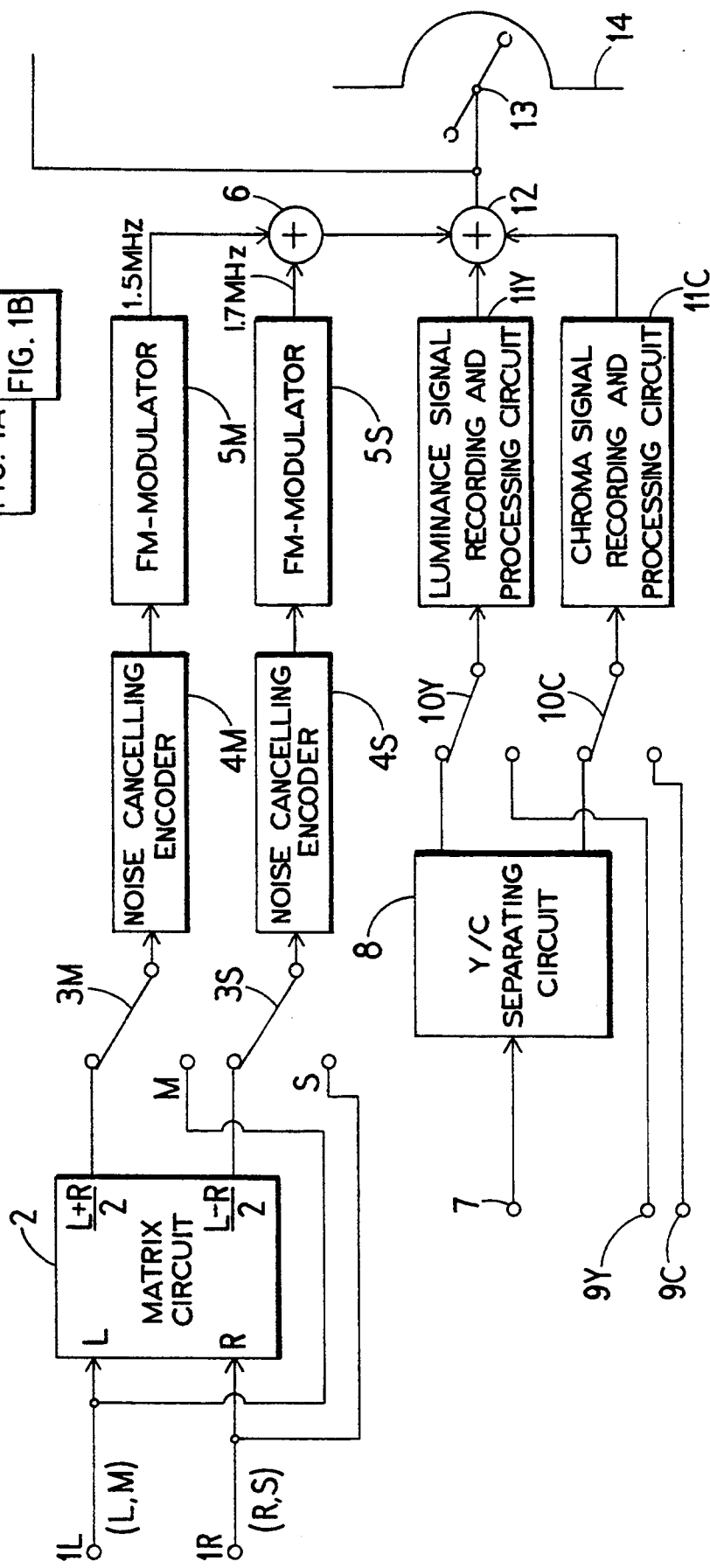

VIDEO TAPE RECORDER WITH AUDIO CARRIER ABSENCE DETECTION

This is a continuation of application Ser. No. 08/064,347 filed May 20, 1993, abandoned May 17, 1994, which was a continuation of Ser. No. 07/629,701, filed Dec. 18, 1990, abandoned Jul. 19, 1993.

BACKGROUND OF THE INVENTION

1. Field of the Invention

The present invention generally relates to video tape recorders and, more particularly, to a video tape recorder such as an 8-mm video tape recorder for recording and/or reproducing a stereo FM (frequency modulated) audio signal.

2. Description of the Prior Art

In a so-called 8-mm video tape recorder (i.e. 8-mm VTR), a stereo audio signal is originally recorded and reproduced in digital fashion, and an FM audio signal is recorded and reproduced in monaural fashion. However, in a later stage, it is necessary to record and reproduce this FM audio signal in a stereo mode.

In the 8-mm video tape recorder, an FM audio signal is made stereophonic as, for example, shown in FIG. 1 (formed of FIGS. 1A and 1B drawn on two sheets of drawings to permit the use of a suitably large scale).

More specifically, as shown in FIGS. 1A and 1B, stereophonic left and right audio signals L, R, or main and sub audio signals M, S, are supplied to input terminals 1L, 1R respectively. In this case, the left or main audio signal L or M is supplied to the input terminal 1L and the right or sub audio signal R or S is supplied to the input terminal 1R.

Signals from these input terminals 1L, 1R are supplied to terminals L, R of a matrix circuit 2. Thus, from the matrix circuit 2, signals $$\frac{L+R}{2} \text{ and } \frac{L-R}{2}$$

are delivered at respective output terminals thereof.

The signal $$\frac{L+R}{2}$$

from this matrix circuit 2 and the main audio signal M from the input terminal 1L are selected by a switch 3M, and the signal $$\frac{L-R}{2}$$

from the matrix circuit 2 and the sub audio signal S are selected by a switch 3S. Then, the signals selected by the switch 3M are supplied to an FM modulator 5M through a noise cancelling encoder 4M and modulated on a first carrier signal of 1.5 MHz. Also, the signals selected by the switch 3S are supplied to an FM modulator 5S through a noise cancelling encoder 4S and are modulated on a second carrier signal of 1.7 MHz. These modulated signals are supplied to a mixer 6.

Furthermore, a composite video signal is supplied to an input terminal 7, and the composite video signal from the input terminal 7 is supplied to a luminance/chroma signal (Y/C) separating circuit 8. Separated luminance signal and chroma signals are supplied to input terminals 9Y and 9C, respectively. The luminance signal Y separated by the separating circuit 8 and the luminance signal from the input terminal 9Y are selected by a switch 10Y, while the chroma signal separated by the separating circuit 8 and the chroma signal from the input terminal 9C are selected by a switch 10C. Furthermore, the signal selected by the switch 10Y is supplied to a luminance signal recording and processing circuit 11Y, and the signal selected by the switch 10C is supplied to a chroma signal recording and processing circuit 11C.

Then, the signals thus processed by these recording and processing circuits 11Y and 11C and the signal from the above-mentioned mixer 6 are mixed by a mixer 12. Furthermore, this mixed signal is supplied to a magnetic head 13 and is recorded on a magnetic tape 14. The recording is performed in this way, while a reproduction is performed as follows.

More specifically, a signal recorded on the magnetic tape 14 is reproduced by the magnetic head 13. This reproduced signal is supplied to a luminance signal reproducing and processing circuit 15Y and a chroma signal reproducing and processing circuit 15C. A luminance signal Y and a chroma signal C, respectively processed thereby for reproduction, are delivered to output terminals 16Y and 16C, and are also supplied to a mixer 17. The mixed composite video signal therein is delivered to an output terminal 18.

Furthermore, the reproduced signal from the magnetic head 13 is supplied to a 1.5 MHz bandpass filter 19M which derives the signal components modulated on the above-mentioned first carrier signal of 1.5 MHz. The signal thus derived from the bandpass filter 19M is supplied to an FM demodulator 20M, in which it is FM-demodulated to provide the above-mentioned signal $$\frac{L+R}{2}$$

or the main audio signal M. The demodulated signal is supplied to a noise cancelling decoder 21M.

Also, the reproduced signal from the magnetic head 13 is supplied to a 1.7 MHz bandpass filter 19S which then derives the signal component modulated on the above-mentioned second carrier signal of 1.7 MHz. The signal derived from the bandpass filter 19S is supplied to an FM demodulator 20S, in which it is FM-demodulated to provide the above-mentioned signal $$\frac{L-R}{2}$$

or the sub audio signal S. The demodulated signal is supplied to a noise cancelling decoder 21S.

The signals from these decoders 21M and 21S are supplied to respective terminals of a matrix circuit 22, in which the above-mentioned signals $$\frac{L+R}{2} \text{ and } \frac{L-R}{2}$$

are processed to provide left and right audio signals L and R which are then delivered to respective terminals for signals L and R.

The left audio signal L from this matrix circuit 22 and the main audio signal M from the decoder 21M are selected by a switch 23L and delivered to an output terminal 24L, and also the right audio signal R from the matrix circuit 22 and the sub audio signal S from the decoder 21S are selected by a switch 23R and delivered to an output terminal 24R.

Therefore, in this circuit of FIG. 1, the audio signals supplied to the input terminal 1L and 1R are converted to a so-called sum signal and a difference signal when they are stereophonic left and right audio signals L and R. The sum signal is transmitted by the first carrier signal while the difference signal is transmitted by the second carrier signal. On the other hand, when the main and sub audio signals M and S are supplied to the input terminals 1L and 1R, the main audio signal M is transmitted by the first carrier signal and the sub audio signal S is transmitted by the second carrier signal.

That is, in the FM audio signal recording of the so-called 8-mm video tape recorder, the second carrier signal is added to the indispensable first carrier signal. For this reason, to maintain compatibility with conventional apparatus having only the first carrier signal, the sum signal and the main audio signal are transmitted by the first carrier signal while the difference signal and the sub signal are transmitted by the second carrier signal, as described above.

In the 8-mm video tape recorder, the frequency of the first carrier signal is determined to be 1.5 MHz with a maximum frequency deviation of ±100 kHz, and the frequency of the second carrier signal is determined to be 1.7 MHz with a maximum frequency deviation of ±50 kHz. As to a recording current, the second carrier signal is set to −2±4 dB as compared with the first carrier signal.

In the above-mentioned 8-mm video tape recorder, even if a video tape on which an FM audio signal is recorded in a stereophonic mode is reproduced by a conventional video tape recorder exclusively used in the monaural mode, a reproduced signal can be obtained without difficulty because the sum signal of the left and right audio signals is reproduced.

However, if a conventional monaurally recorded video tape is reproduced by a video tape recorder which can reproduce the audio signal in the stereophonic mode, high level noises are generally generated from the FM demodulator 20S. If these noises are supplied to the matrix circuit 22, resultant left and right audio signals are mixed with high level noises so that the normal reproduction cannot be made.

Therefore, conventionally, as for example shown in FIG. 2, a filter output from the 1.7 MHz bandpass filter 19S is supplied to a level detector 25, and this detected output is supplied to a comparator 26, wherein the presence of the second carrier signal is determined (a determined output is delivered to an output terminal 27) when the level of the filter output is above a predetermined value.

However, this method is easily affected by the changes in level of a reproduced signal from the magnetic head 13, and an erroneous decision may easily occur. Also, a malfunction may be incurred by disturbing waves. For example, if a lower side band of the luminance signal Y, which is FM-recorded, existed in the vicinity of 1.7 MHz at a high level, there is then the risk that the presence of the second carrier signal would be determined regardless of the absence of the second carrier signal.

SUMMARY OF THE INVENTION

Accordingly, it is an object of the present invention to provide an improved video tape recorder which can eliminate the aforenoted shortcomings and disadvantages encountered with the prior art.

More specifically, it is an object of the present invention to provide a video tape recorder which can be protected from being affected by the level change of a reproduced signal from a magnetic head.

It is another object of the present invention to provide a video tape recorder which can be prevented from malfunctioning due to the mis-detection of a disturbing wave.

According to an aspect of the present invention, a video tape recorder for recording and/or reproducing a stereo frequency-modulated audio signal by a pair of carrier signals of an indispensable first carrier signal and an additional second carrier signal is comprised of a circuit for demodulating the second carrier signal to provide a demodulated output, and a circuit for comparing an amplitude of the demodulated output with a predetermined value. When the amplitude of the demodulated output is below the predetermined value, it is determined that the second carrier signal exists.

The above, and other objects, features and advantages of the present invention will become apparent in the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1B:
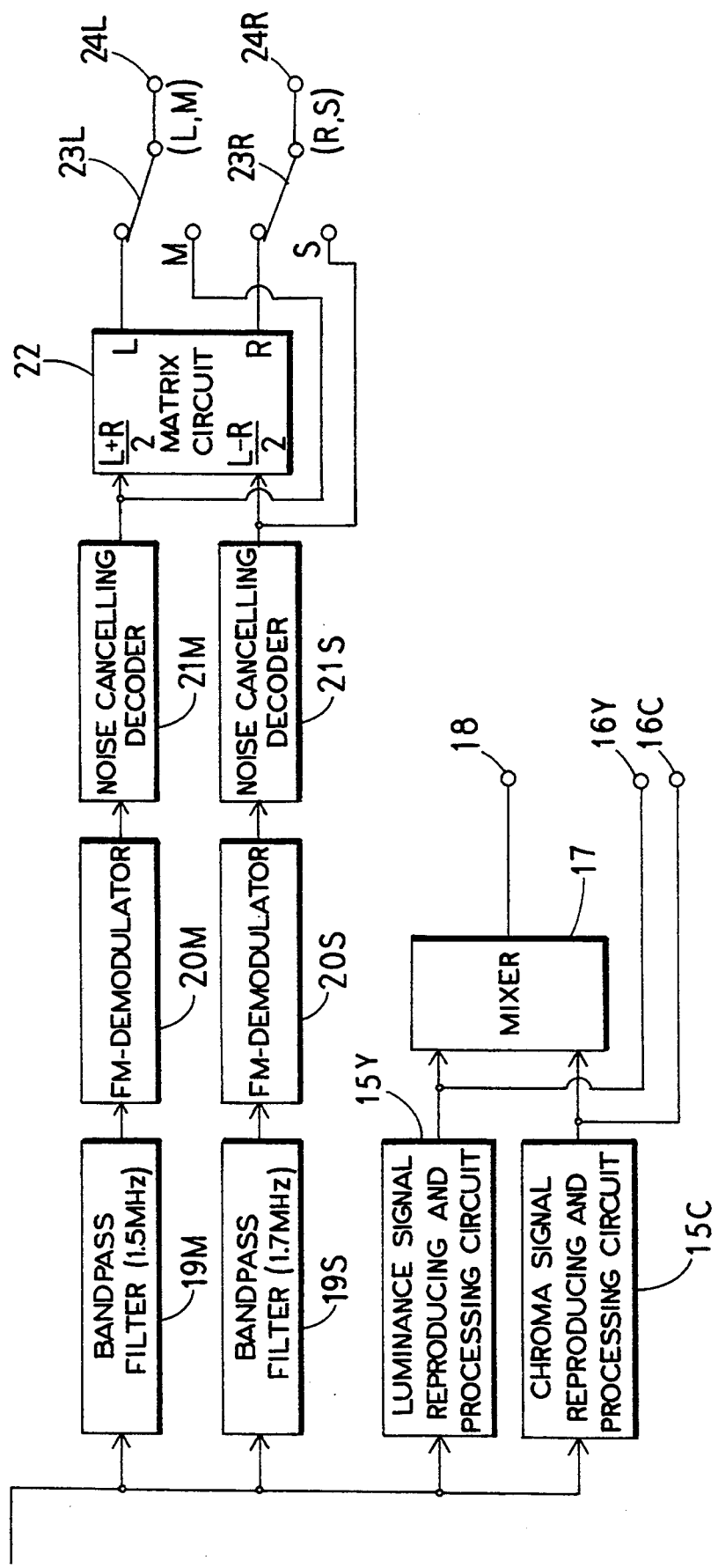
FIG. 1 (formed of FIGS. 1A and 1B drawn on two sheets of drawings to permit the use of a suitably large scale) is a block diagram showing an example of a signal system of a so-called 8-mm video tape recorder to which the present invention is applied.
Figure 2:
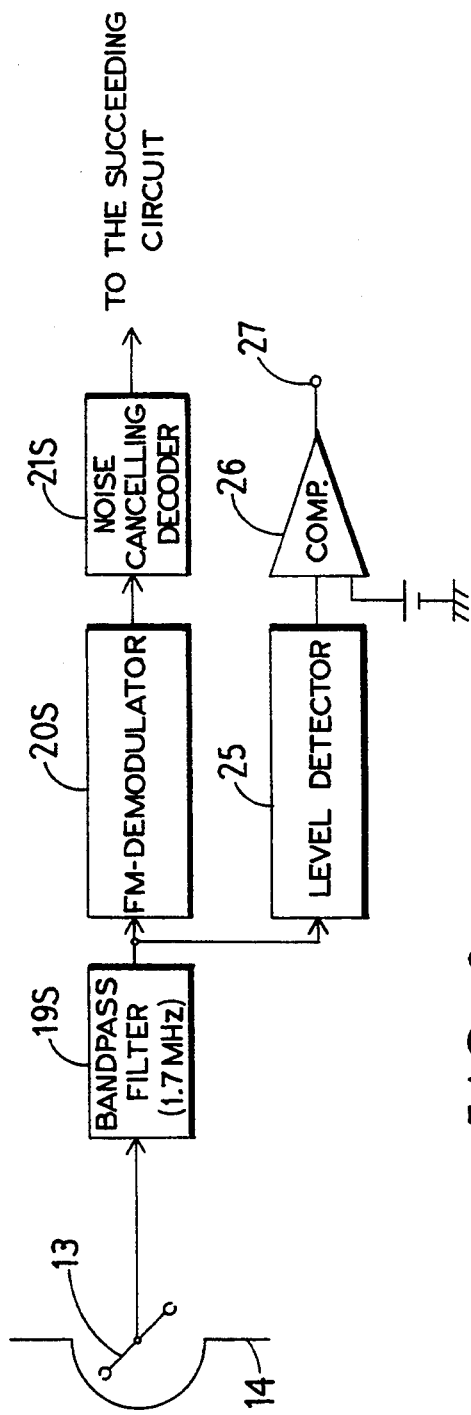
FIG. 2 is a schematic block diagram showing a circuit arrangement of the prior art.
Figure 3:
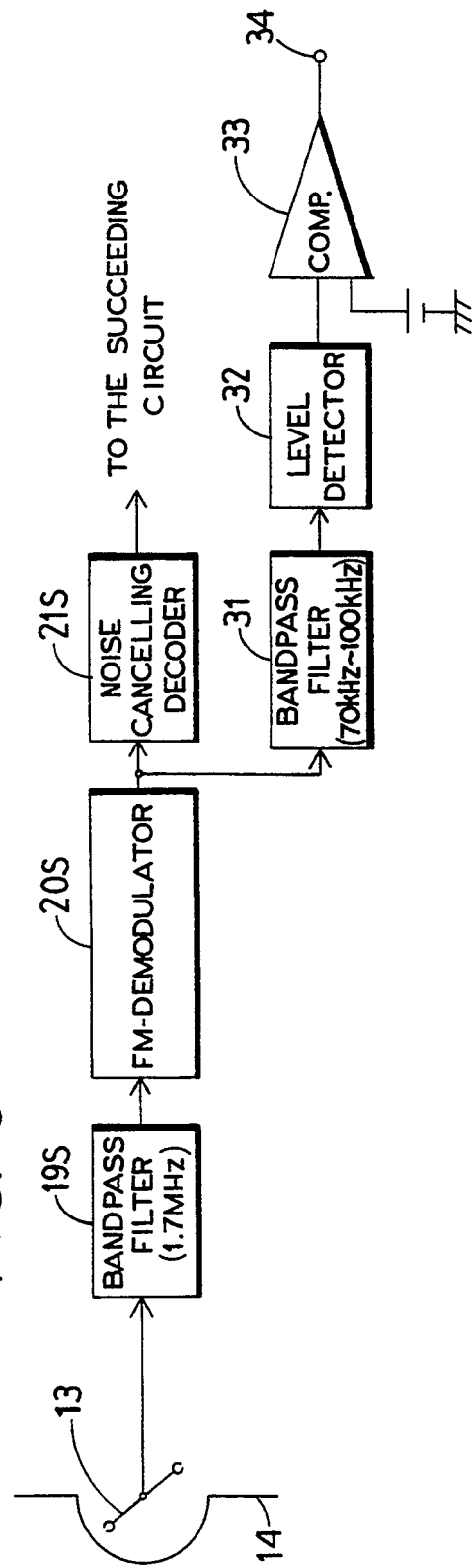
FIG. 3 is a schematic block diagram showing an embodiment of a video tape recorder according to the present invention.

An embodiment of the video tape recorder according to the present invention will now be described hereinafter with reference to FIG. 3. In FIG. 3, like parts corresponding to those of FIGS. 1 and 2 are marked with the same references and therefore need not be described in detail.

Referring to FIG. 3, the demodulated output from the FM demodulator 20S is supplied to a bandpass filter 31 of, for example, 20 kHz to 100 kHz, and the filter output of the bandpass filter 31 is supplied to a level detecting circuit 32. A level detected output from the level detecting circuit 32 is supplied to a comparator 33, and a compared output therefrom is delivered to an output terminal 34.

More particularly, in the above-mentioned 8-mm video tape recorder, when the FM demodulation is performed normally, the output from the FM demodulator 20S to demodulate the second carrier signal has the following features:

(1) The frequency spectrum of the demodulated signal is limited within a demodulating frequency band (e.g., lower than 20 kHz); and (2) The output amplitude is limited below a fixed value as follows:

(signal component)+(undesired components associated with carrier signal) where the signal components are, limited below a maximum frequency deviation in the recording system.

The undesired components associated with the carrier signal are frequency components twice the carrier frequency and so on and are below the fixed value which is determined, depending on the circuits.

Accordingly, when these conditions are not satisfied, it may be determined that the second carrier signal does not exist.

Therefore, in the above-mentioned circuit, components within the modulating frequency band and the undesired components associated with the carrier signal are removed by the bandpass filter 31, and this filter output is converted into a direct current voltage by a level detector 32. A level detected output is then compared with a reference voltage by the comparator 33 to determine that the second carrier signal exists when this voltage is below the reference voltage. The decided output can be delivered to the output terminal 34.

Thus, according to the above-mentioned circuit, the amplitude of an FM demodulated signal is detected to determine whether or not the second carrier signal exists so that the decision of the second carrier signal can be prevented from being affected by the changes in level of reproduced signals from the magnetic head, and malfunctions due to an erroneous detection of disturbing waves can be satisfactorily prevented.

In the above-mentioned circuit, depending upon the characteristic of the 1.7 MHz bandpass filter 19S and the characteristic of the FM demodulator 20S, even if the bandpass filter 31 is simplified by a high-pass filter and a trap circuit, or is omitted, it is possible to obtain a sufficient level difference due to the presence or absence of the second carrier signal in the output amplitude from the FM demodulator 20S.

As set out above, according to the present invention, since the presence of the second carrier signal is determined by detecting the amplitude of the FM demodulated signal, the decision as to the second carrier signal can be prevented from being affected by the changes in level of the reproduced signal from the magnetic head, and malfunction due to the erroneous detection of the disturbing waves can be favorably prevented.

Having described a preferred embodiment of the invention with reference to the accompanying drawings, it is to be understood that the invention is not limited to that precise embodiment, and that various changes and modifications thereof could be effected by one skilled in the art without departing from the spirit or scope of the novel concepts of the invention as defined in the appended claims.

I claim as my invention:

1. A video tape recorder frequency-modulated audio signal detection system for reproducing both monaural and stereo signals wherein a first indispensible carrier signal modulated by a first audio modulating signal and a second additional carrier signal modulated by a second audio modulating signal is reproduced from a tape, said first indispensible carrier signal modulated by said first audio signal being used for monaural reproduction, comprising:

first FM demodulator means for demodulating said first indispensible carrier signal and providing a demodulated output including said first audio signal;

second FM demodulator means for demodulating said second additional carrier signal and providing a demodulated output including said second audio signal;

detector means for comparing an amplitude of said demodulated output from said second FM demodulator means representing a frequency band above said second audio modulating signal and below undesired components of said second carrier signal with a predetermined value and detecting an existence of said second additional carrier signal in response to said comparison; and said detector means comprising a bandpass filter means having its low end selected for removing components within the audio modulating frequency bandwidth of the second audio modulating signal and its high end selected for removing the undesired components associated with the second additional carrier signal in said demodulated output and providing an associated bandpassed output, said band pass filter means being connected to an output of said second FM demodulator means, said bandpassed output of said filter means being connected to a level detector means for converting an output of said filter means into a DC voltage, and an output of said level detector means being connected to a comparator means for comparing the DC voltage to a predetermined value.

2. A system according to claim 1 wherein a first bandpass filter means is provided at an input of said first FM demodulator means and a second bandpass filter means is provided at an input to said second FM demodulator means.

3. A video tape recorder frequency-modulated audio signal detection system for reproducing both monaural and stereo signals wherein a first indispensible carrier signal modulated by an L+R audio modulating signal and a second additional carrier signal modulated by an L−R audio modulating signal is reproduced from a tape, the L signal being a left channel signal and the R signal being a right channel signal for stereo, and said first indispensible carrier signal modulated by said L+R signal being used for monaural reproduction, comprising:

first FM demodulator means for demodulating said first indispensible carrier signal and providing a demodulated output including said L+R signal;

second FM demodulator means for demodulating said second additional carrier signal and providing a demodulated output including said L−R signal;

detector means having a bandpass filter for comparing an amplitude of said demodulated output from said second FM demodulator means representing a frequency band selected by said bandpass filter above said L−R audio modulating signal and below undesired components of said second carrier signal with a predetermined value and detecting an existence of said second additional carrier signal in response to said comparison, said bandpass filter having an associated bandpassed output; and said detector means comprising a level detector means connected to said bandpassed output for converting the demodulated output from said second FM demodulator means into a DC voltage, and an output of said level detector means being connected to a comparator means for comparing the DC voltage to a predetermined value.

* * * * *